US007329963B2

(12) United States Patent
Omer

(10) Patent No.: US 7,329,963 B2

(45) Date of Patent: Feb. 12, 2008

(54) HYDRO-ELECTRICAL GENERATOR

(76) Inventor: Bndean Abdulkadir Omer, 206 Holdenhurst Road, Bournemouth, BH8 8AT (GB)

(*) Notice: Subject to any disclaimer, the term of this patent is extended or adjusted under 35 U.S.C. 154(b) by 0 days.

(21) Appl. No.: 11/342,131

(22) Filed: Jan. 27, 2006

(65) Prior Publication Data

US 2006/0168954 A1 Aug. 3, 2006

(30) Foreign Application Priority Data

Jan. 28, 2005 (GB) ................................ 0501837.9

(51) Int. Cl.
*F03B 13/00* (2006.01)
*H02P 9/04* (2006.01)

(52) U.S. Cl. .......................................... 290/54; 290/43

(58) Field of Classification Search .................. 290/43, 290/42, 54, 53; 416/7, 8, 111; 405/76
See application file for complete search history.

(56) References Cited

U.S. PATENT DOCUMENTS 577,314 A * 2/1897 McMurrin .................. 198/702
586,915 A * 7/1897 Pond ............................ 416/7
616,278 A * 12/1898 Walker .......................... 416/7
1,493,412 A * 5/1924 Abbey ........................... 416/8
1,687,923 A * 10/1928 Baer ............................ 416/8
1,749,506 A * 3/1930 Randmetz ...................... 416/7
3,928,771 A * 12/1975 Straumsnes .................. 290/43
4,049,300 A * 9/1977 Schneider .................... 290/54
4,352,990 A * 10/1982 Aucoin, Jr. .................. 290/54
4,494,008 A * 1/1985 Patton ......................... 290/44
4,642,022 A * 2/1987 Rydz ............................ 415/5
4,930,985 A * 6/1990 Klute ............................ 416/8
5,136,174 A * 8/1992 Simoni ........................ 290/54

FOREIGN PATENT DOCUMENTS

FR 2689184 A1 * 10/1993
JP 2000087840 3/2000
WO WO2005/028857 3/2005

* cited by examiner

*Primary Examiner*—Julio Gonzalez
(74) *Attorney, Agent, or Firm*—Beem Patent Law Firm

(57) ABSTRACT

An hydroelectric generator for generating an electrical current from moving water comprises two endless belts arranged parallel to each other with adjacent runs running in the same direction. A plurality of paddles are mounted on one of the belts and arranged to engage the other belt over substantially the run of the belts where the belts are running adjacently and means are provided for directing the moving water between the two belts An electrical generator is driven by one or both belts.

12 Claims, 5 Drawing Sheets

23 25 3 13 11 7 1 13 17 21 19 11 33 35 5 31 9 15 11 37 39 41

HYDRO-ELECTRICAL GENERATOR

FIELD OF THE INVENTION

This invention relates to an hydro electrical generator and more particularly to an hydro-electrical generator for generating electricity from energy to be found either from flowing water such as found in a river or a stream or tidal or wave motion of water as can, for example, be found in the sea.

BACKGROUND OF THE INVENTION

There is a problem today in the generation of electricity by many of the standard methods which use up natural resources, are dangerous and/or require very expensive apparatus and installation. These include coal fired power stations which use up the worlds coal resources and produce carbon dioxide adding to the green house effect, nuclear power stations which while using up the world's supply of radioactive material require sizeable structures to contain the radiation and suffer from the disadvantage of leaving radio active waste to be disposed of as a by product. A third type is the hydro electric power stations. These are the most environmentally friendly type but require there to be a large head of water and a considerable drop to provide the necessary kinetic energy to drive the electric generator turbines.

It is therefore desirable to find some other means of generating electricity in which can use much more readily available sources of energy such as the running water of rivers or the wave energy to be found in the sea. There have been many proposals for harnessing such sources of energy but, generally speaking, these proposals have met with little success due to either the complexity of the apparatus needed to harness it or to the difficulty in converting the energy.

The present invention seeks to provide an hydroelectric generator which is of a relatively simple construction and provides an efficient cost effective system.

SUMMARY OF THE INVENTION

According o the invention, there is provided an hydro-electric generator for generating an electrical current from moving water comprising two endless belts arranged parallel to each other with adjacent runs running in the same direction, a plurality of paddles mounted on one of the belts and arranged to engage the other belt over substantially the run of the belts where the belts are running adjacently, means for directing the moving water between the two belts and an electrical generator driven by one or both belts.

Preferably the belts are arranged one above the other, and the paddles may be carried by the upper belt and cooperate with engagement means on the lower belt.

The paddles may be hinged to the belt which carries them so that they can fold against the carrying belt on the return run of the belt.

The paddles may have a generally flat front face pointing in a direction reverse to the direction of movement of the belts and have a rear face opposite to the front face shaped to provide a minimum of resistance of the blade through water.

However, for wave use, for maximising utilisation wave motion, the paddles have generally flat front face pointing in a direction reverse to the direction of movement of the belts and have a rear face opposite to the front face and defining a hollow portion within the paddle into which water can flow providing stabilisation of the paddle , means being provided for allowing water to exit from the paddle so as to provide a water throughput through the paddle and reduce the resistance to movement of the paddle.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
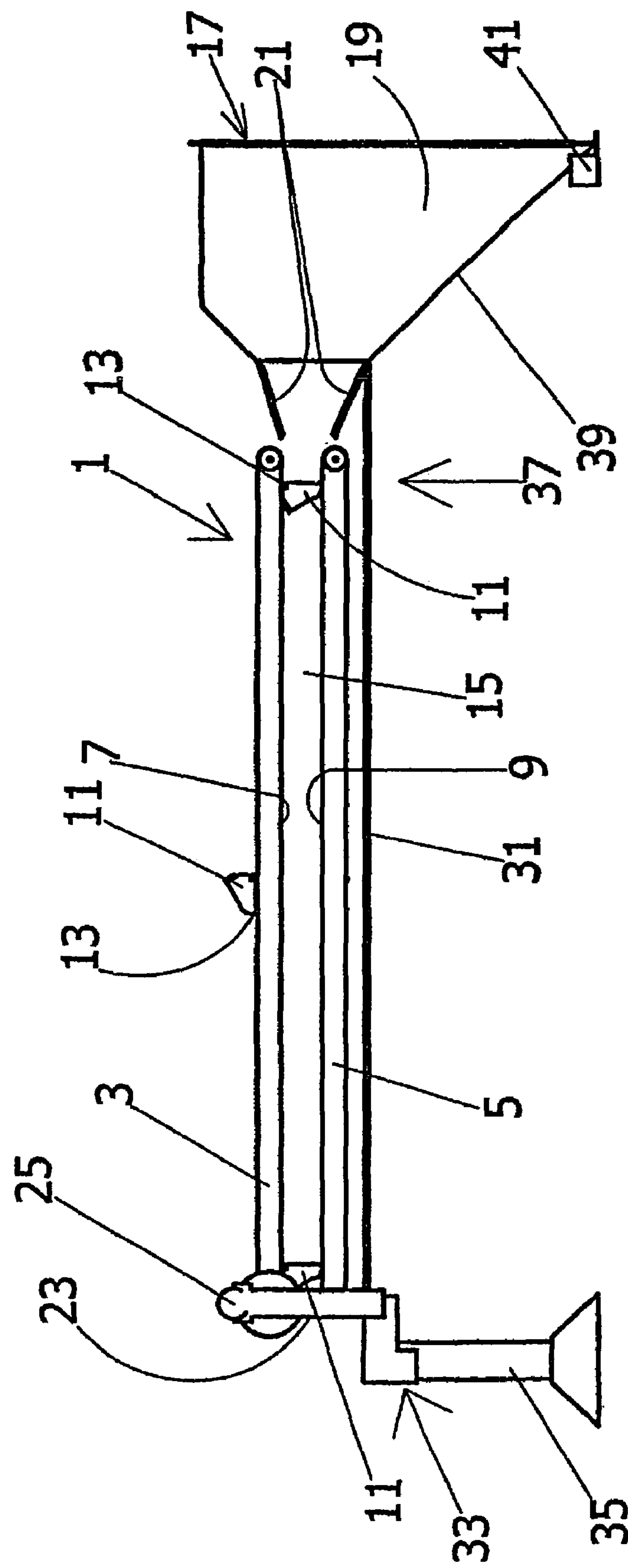
FIG. 1 is a schematic side view of one embodiment of the invention.
Figure 2:
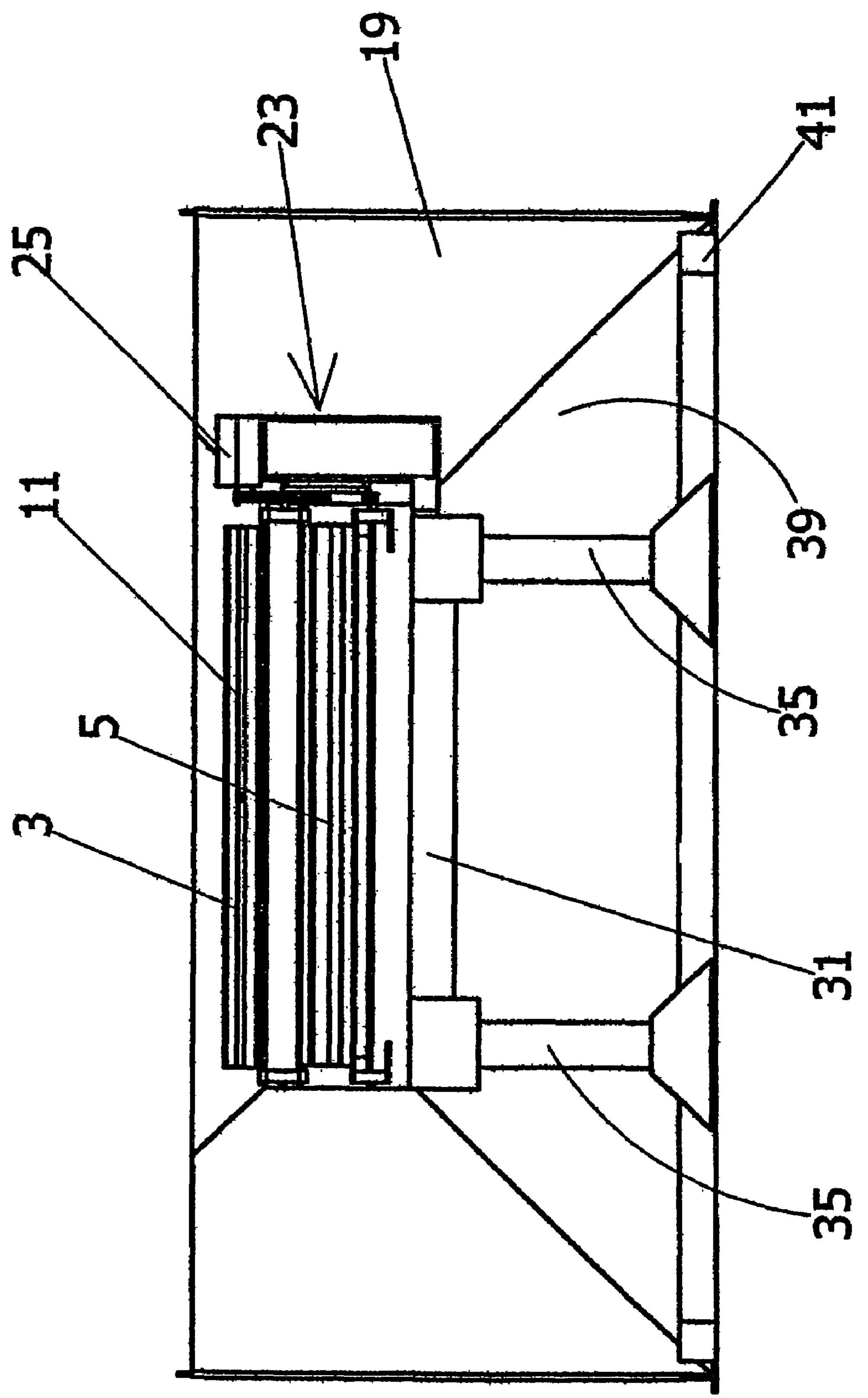
FIG. 2 is a schematic end view of the embodiment shown in FIG. 1 taken from the left hand end of this figure.

Referring firstly to FIGS. 1 and 2 of the drawings, there is shown an hydroelectric generator 1 comprising a pair of parallel endless belts 3 and 5 with adjacent runs 7 and 9 of the belts 3 and 5 running in the same direction. The upper belt 3 carries a number of paddles 11, in the instance shown, three. With three paddles 11, it ensures that there will always be one paddle 11 in the runs 7 and 9 at any one time. However, more paddles 11 could be used but with the set up as shown, it is believed that this will be the most efficient . the lower belt 5 is provided with cooperating engagement means (not shown) which will engage the free ends of the paddles 11 when they are in the run 7 position. The paddles 11 are pivoted to the belt 3 at 13 so that they can move from an extended position between the runs 7 and 9 to a retracted position against the belt 3 during the return run. It will be appreciated that the design of the paddles will depend on whether the water flow with which they are intended to be used is of a constant flow or wave type and this will be discussed hereafter.

The belts are arranged so as to provide a channel 15 to receive water between the runs 7 and 9. To this end there is provided a guiding apparatus 17 in the form of a venturi 19 which guides incoming water (from the right in FIG. 1). The narrow end of the venturi 19 is provided with guide flaps 21 which can be adjusted as necessary to suit the prevailing conditions.

At the end of the belts 3 and 5 away from guiding apparatus a gear set 23 is provided. This gear set 23 couples the two belts 3 and 5 together so as to ensure that they drive in synchronism with the runs 7 and 9 running in the same direction and will provide a drive for transferring power received by the belts 3 and 5 through the paddles 11 to an electric generator 25. The whole arrangement is supported on a framework comprising a base plate 31 carried at one end 33 (to the left in FIG. 1) on legs 35 and at the other end 37 (to the right in FIG. 1) by the lower part 39 of the venturi 19 which may be provided with suitable weights 41 to increase the stability.

The operation of the hydroelectric generator will now be described:

The apparatus is set up in a suitable position in either a river or in the sea with the venturi 19 aligned with the direction of flow of either the river water or the waves and is adjusted, particularly using the flaps 21 to channel the water into the channel 15 between the belts 3 and 5. The flow of the water or the waves will impinge on the paddle 11 which is extending across the channel 15 and drive it to the left in FIG. 1. This motion of the paddle 11 will drive both belts 3 and 5 to the left rotating the gear set 23 and drive the generator 25 to generate electricity. As the paddle 11 reaches the end of the run, the next paddle 11 will come down from the upper run of the belt 3 and will engage the engagement means on the lower belt 5 to take up a position across the channel 15 to receive the water flow or waves and continue to drive the belts 3 and 5. In the meantime, the original paddle 11 will have reached the end of its run and will run round the end of the belt onto the return run of the upper belt 3, having disengaged from the engagement means of the belt 5 and folded, under gravity against the belt 3.

Figure 3:
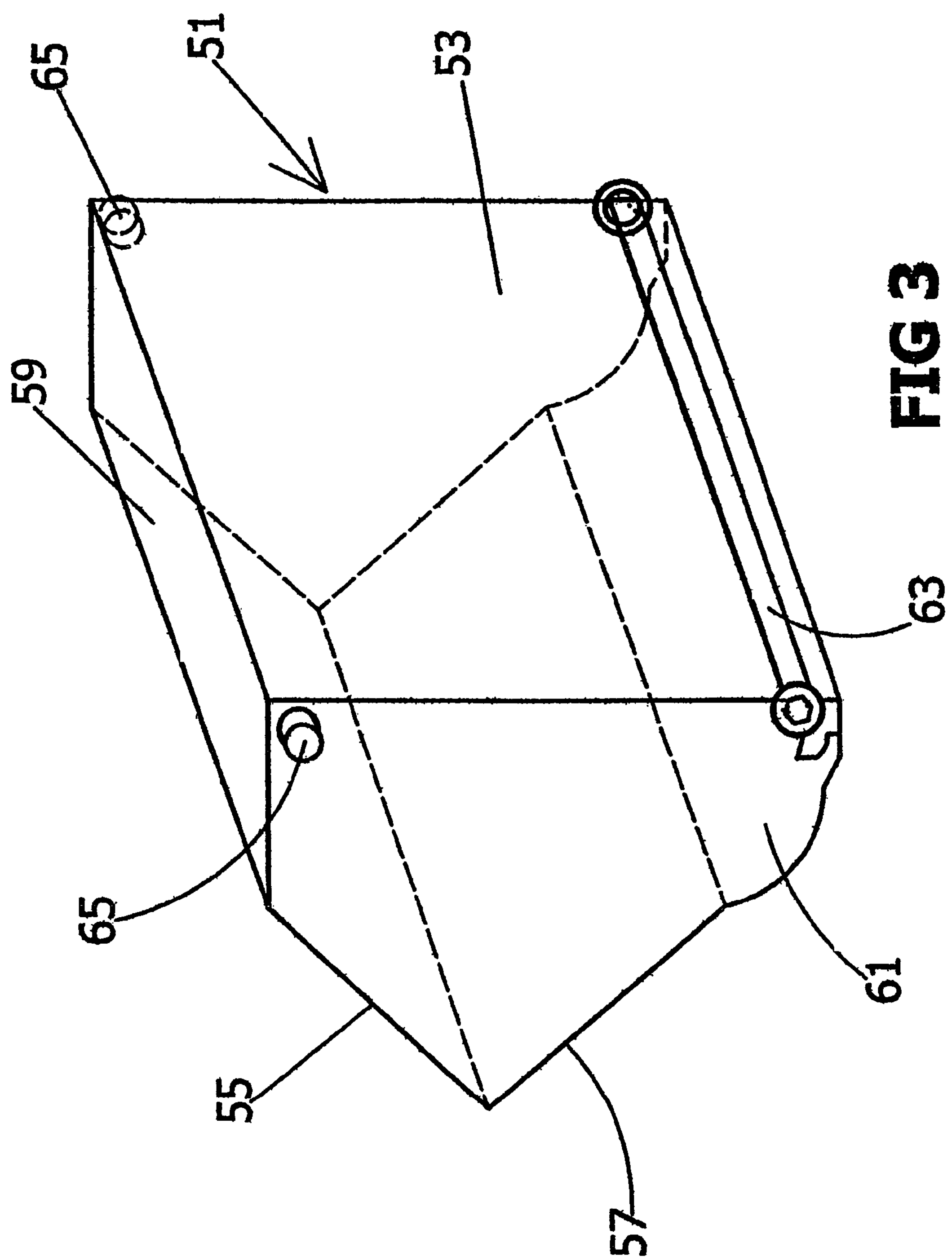
FIG. 3 is a schematic isometric view of a paddle suitable for use with constant flow water.

It will be appreciated that with a river flow, the movement of the belts 3 and 5 will be substantially continuous and can provide a direct drive to the generator. However, in the case of wave flow, this will be intermittent due to the wave motion and means will be required for evening out this movement between the belts and the generator. One possibility is to use an hydraulic cylinder driven in one direction by the belts and be returned in the opposite direction by a spring or similar arrangement during the period in which the belts are not being driven. The reciprocating movement of the hydraulic cylinder can then be converted into a continuous rotary movement by any known means As has already been stated, the design of the paddles 11 will depend on the type of flow being encountered. FIG. 3 shows a design of paddle suitable for use with constant flow. This paddle, referenced 51 will have a flat front or operating face 53 while the rear part comprising two converging surfaces 55 and 57 connected to the front face 53 by a straight portion 59 and a curved portion 61. The angles concerned between the surfaces and the curvature of the curved portion 61 will be designed to provide the least resistance to movement of the paddle through the water which will remain to the rear of the paddle 51 during operation. In this figure, the pivot axis of the paddle 51 for pivoting to the belt 3 is shown at 63 while means for engagement with the engagement means on the lower belt 5 is shown at 65.

Figure 4:
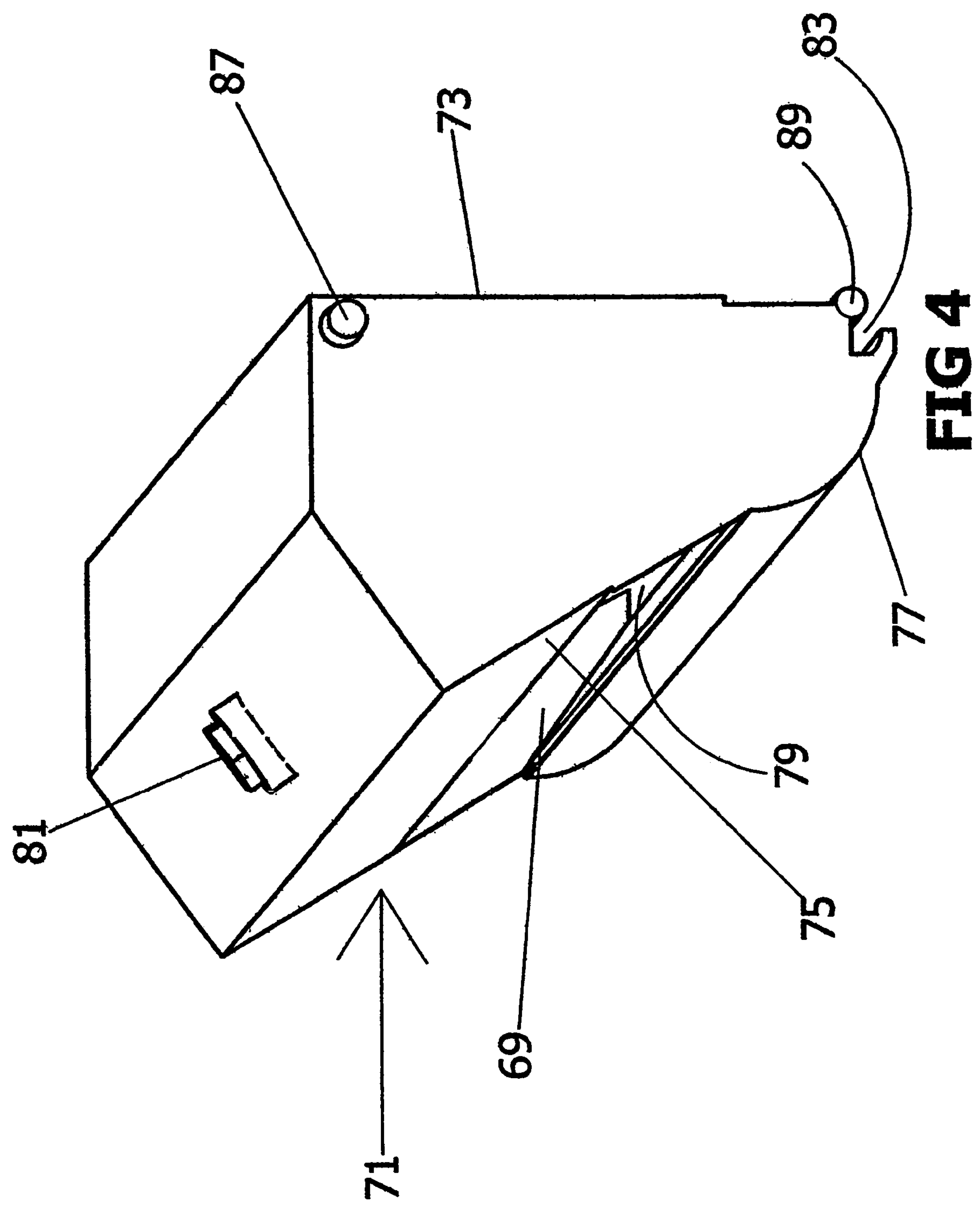
FIG. 4 is a schematic isometric view of a paddle suitable for use with wave motion.

FIG. 4 shows a design of paddle 11 for use in wave applications. This paddle 71 again has a flat front face 73 and a slanting rear face 75 connected to the front face 73 by a generally curved portion 77. The rear face 75 has a rearwardly facing opening 69. Within the paddle 71, there is a hollow portion 79 into which water can enter through an opening 81 in the upper surface of the paddle 71. This inflow of water results either from the water resistance behind the paddle in the forward stroke of the wave or from the return stroke of the wave. The water will exit the paddle through the opening 69. The water in the hollow portion 79 will help to stabilise the paddle in its operative position. Some of the water will exit through a forwardly facing opening 83 at the bottom of the paddle 71 and in doing so will act to provide an additional drive to the paddle 71 in the drive direction, i.e. to the left in FIG. 4.87 shows the pivot axis of the paddle where it is pivoted to the upper belt 3 and 89 shows means for engagement with the engagement means on the lower belt 5. It will also be seen from FIG. 4, that the rear of the paddle 71 has inclinations rearwardly to reduce the resistance to travel through the water behind the paddle while the paddle is being acted on by a wave. The dimensions of the hollow portion 79 is such that the quantity of water it contains is proportional to the weight of the paddle and so keep it in balance. This will assist the paddle 71 to be positioned and maintained at the correct level in relation to the wave and will also help to reduce the load on the belts as well as keeping the paddle in the centre of the wave.

Figure 5:
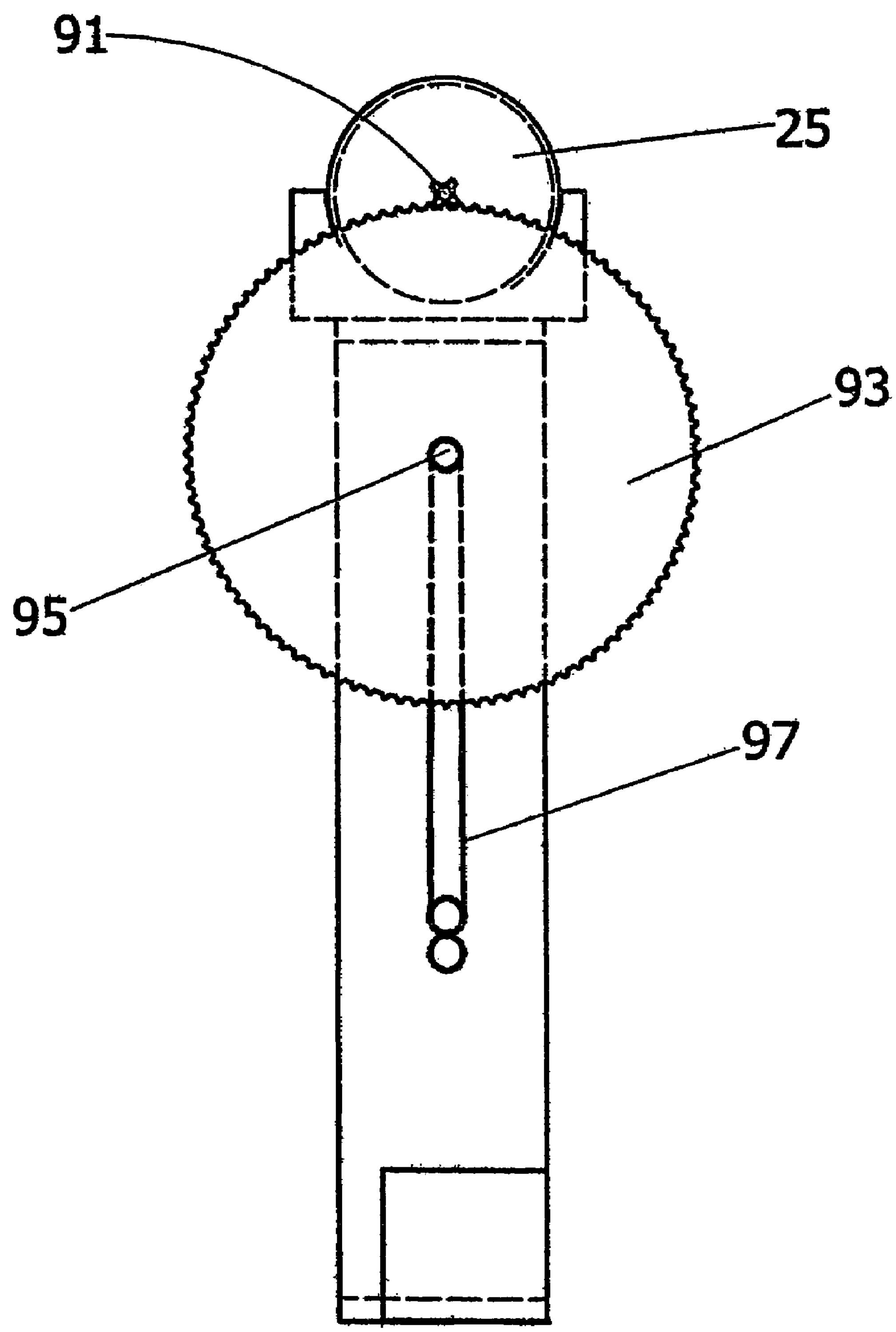
FIG. 5 is an enlarged side view of a suitable drive between the belts and the electric generator.

FIG. 5 shows an enlarged side view of a suitable generator drive for the situation of a constant water flow. Here can be seen the generator 25 having a small gear 91 which cooperates with a larger gear wheel 93 on a shaft 95 connected to the upper drive belt 3. The upper and lower belts 3 and 5 are connected for movement together by a chain and sprocket drive 97.

It will be appreciated that many modifications of or additions to the above described embodiment without departing from the scope of the invention. For example, while drive belts have been described, these could be replaced by chains, preferably at least one on each side of the paddles. The number of paddles used could be increased above the three shown if desired. Other suitable drives could be provided for the generator using other combinations of gears and chains. Also other means could be used to smooth out the intermittent drive caused in the case of wave motion. Such smoothing arrangements could make use of a flywheel which would keep the drive operating for those periods in which the belts are not driven by the wave. While the belts have been shown as horizontal, the could, if desired be inclined to the horizontal, for example, to take into account a slope of a river bed.

The invention claimed is:

1. An hydro-electric generator for generating an electrical current from moving water comprising two endless belts spaced from and arranged parallel to each other with adjacent runs running in the same direction, a plurality of paddles pivotally mounted on one of the belts so as to be movable between an extended and a retracted position, engagement means on the other belt to engage the paddles over substantially the run of the belts where the belts are running adjacently and hold the paddles in said extended position, directing means for directing the moving water between said two belts and an electrical generator driven by one or both belts.

2. A generator as claimed in claim 1, wherein said belts are arranged one above the other.

3. A generator as claimed in claim 2, wherein said paddles are carried by the upper belt and cooperate with engagement means on the lower belt.

4. A generator as claimed in claim 3, wherein said paddles are hinged to said upper belt so that they fold against said upper belt on the return run of said upper belt.

5. A generator as claimed in claim 1, wherein the paddles have a generally flat front face pointing in a direction reverse to the direction of movement of said belts and have a rear face opposite to said front face shaped to provide a minimum of resistance of the paddles through water.

6. A generator as claimed in claim 5, wherein said belts are arranged one above the other.

7. A generator as claimed in claim 6 wherein said paddles are carried by the upper belt and cooperate with engagement means on the lower belt.

8. A generator as claimed in claim 7, wherein said paddles are hinged to said upper belt so that they fold against said upper belt on the return run of said upper belt.

9. A generator as claimed in claim 1, wherein, for maximising utilisation wave motion, said paddles have a generally flat front face pointing in a direction reverse to the direction of movement of said belts and have a rear face opposite to said front face and defining a hollow portion within the paddle into which water flows providing stabilisation of the paddle, and exit means in said paddles through which water exits from the paddle so as to provide a water throughput through the paddle and reduce the resistance to movement of the paddle.

10. A generator as claimed in claim 9, wherein said belts are arranged one above the other.

11. A generator as claimed in claim 10, wherein said paddles are carried by the upper belt and cooperate with engagement means on the lower belt.

12. A generator as claimed in claim 11, wherein said paddles are hinged to said upper belt so that they old against said upper belt on the return run of said upper belt.

* * * * *